Patented Aug. 17, 1948

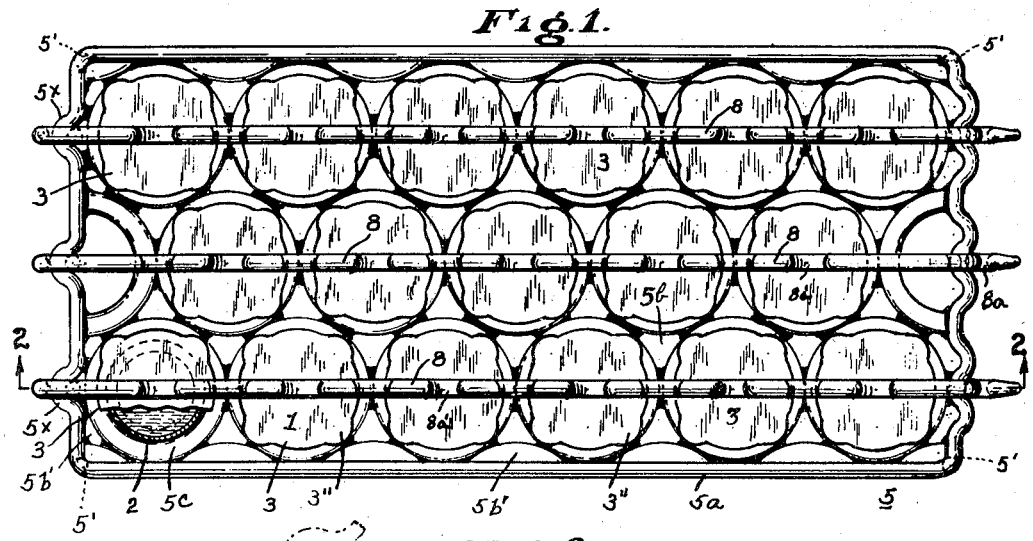
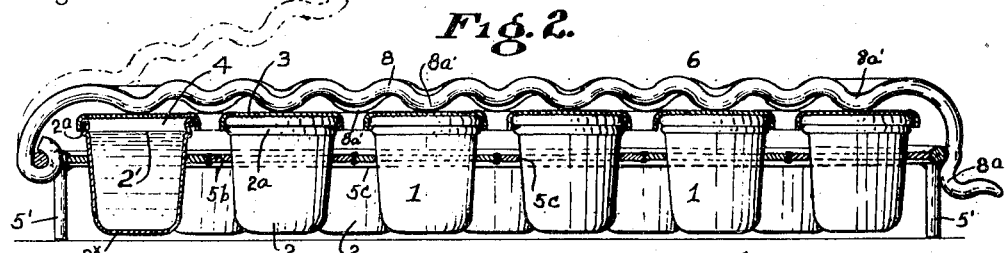
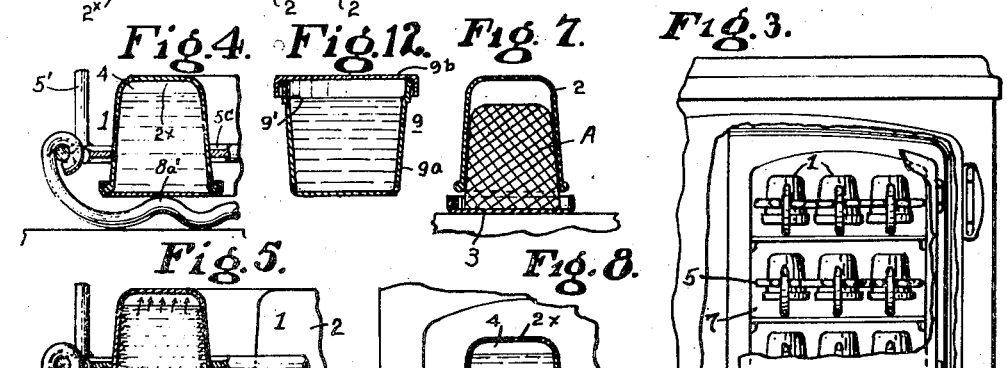
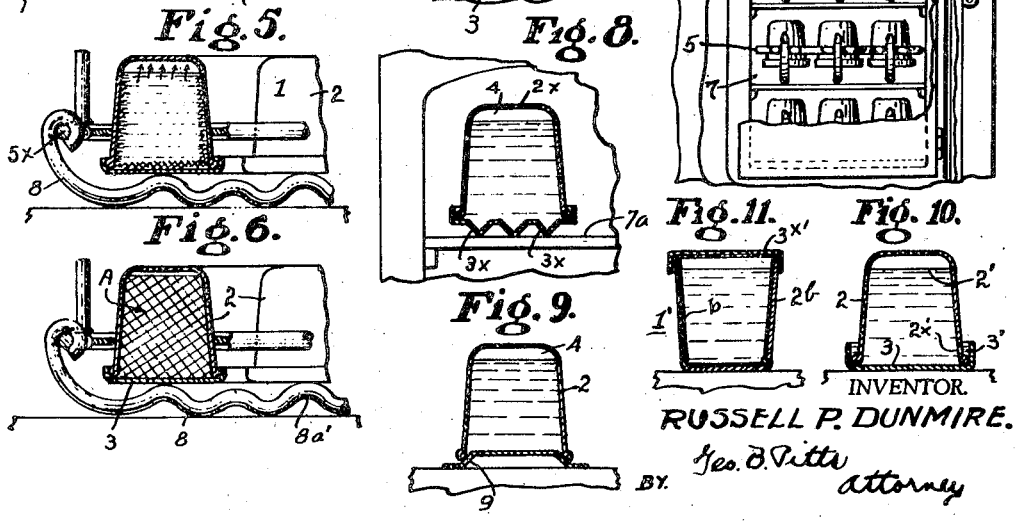

2,447,170

UNITED STATES PATENT OFFICE 2,447,170

PROCESS OF FREEZING LIQUID AND APPARATUS THEREFOR

Russell Paul Dunmire, Orange, Ohio

Application August 24, 1943, Serial No. 499,799

13 Claims. (Cl. 62—172)

This invention relates to a process for freezing liquids and the apparatus for carrying out the process in a manner which insures removal of the frozen liquid without waste thereof and/or water. In carrying out the process herein disclosed I have frozen water in small cakes ordinarily termed "ice cubes," as the invention lends itself to the formation of ice cakes of this type, and effect the removal thereof individually and/or independently of all of the remaining cakes frozen simultaneously with those removed. In mechanical refrigerators for domestic use, it is customary to freeze water or other liquid in a multi-celled tray or holder, but difficulty arises in removing the frozen cakes, whether one or a few thereof or all are to be removed. In some instances the water containing cells are formed of rubber and relatively movable for the purpose of removing the frozen blocks or cakes; in other instances mechanical devices have been employed to loosen the frozen cakes or cubes. In all these forms of construction it has been the practice, so far as my knowledge goes, to initially run cold or hot water over the cakes or the walls therefor and then to manually loosen the cakes, so that not only was the applied water wasted but portions of the cakes were melted and more removed than were to be used.

In still other instances, it has been the practice to employ covered receptacles the walls of which were conically shaped or inclined toward their open ends, so that the expansion of the liquid against the walls of the receptacles due to freezing of the liquid was utilized to separate the cover from the receptacle. In this form of construction, the receptacles were inverted to permit the frozen cakes to gravitate downwardly.

According to my process, where a plurality of cakes are simultaneously frozen, one or more receptacles with frozen cakes therein may be removed from the holder therefor independently of the remaining receptacles, following which each receptacle is automatically detached from the frozen cake, and thereafter the empty receptacles may be re-filled with liquid and replaced in the holder and this in turn returned to the refrigerator unit without waste of any of the remaining frozen cakes.

One object of the invention is to provide an improved process of freezing liquid in a container to the end that the frozen liquid is removable from the container in a ready manner.

Another object of the invention is to provide an improved process of freezing liquid in a container whereby exposure of the latter to normal or atmospheric temperature insures loosening and separation of the container from the frozen liquid.

Another object of the invention is to provide an improved process of freezing liquid in a container, wherein provision is made for sealing the container with a space between the upper surface of the liquid and the inner walls of the container, freezing the liquid and forcing air therein into said space, whereby upon subjecting the walls of the container to a temperature above that utilized for freezing the liquid, the air in said space will expand and cause a separation of the container and frozen cake.

Another object of the invention is to provide an improved process of freezing liquid in a container by a freezing medium or atmosphere, wherein provision is made for automatically separating the frozen liquid and container upon removal of the latter from its freezing medium or atmosphere, whereby manual manipulation of the container or application of water thereto to effect release of the frozen liquid is eliminated.

Another object of the invention is to provide an improved support for a plurality of containers wherein liquid is to be frozen, arranged to permit the ready removal of one or more containers therefrom whereby, after the liquid therein is frozen, one or more containers may be removed from the support, the frozen liquid therein removed and the container or containers re-filled with liquid and replaced in the support, without removal of the remaining containers or waste of the frozen liquid therein.

Other objects of the invention will be apparent to those skilled in the art to which my invention relates from the following description taken in connection with the accompanying drawings which show a receptacle and a group of receptacles which may be used in carrying out the process.

Fig. 1 is a plan view of a support or holder for a plurality of receptacles, the support or holder for reasons later apparent being constructed to maintain the receptacles in a predetermined relation during the step of freezing liquid therein.

Fig. 2 is a section on the line 2—2 of Fig. 1.

Fig. 3 is a fragmentary elevation of a refrigerator showing the freezing unit thereof and a plurality of holders mounted in the unit.

Fig. 4 is a fragmentary section (also on the line 2—2 of Fig. 1) showing a receptacle filled with the required quantity of liquid and inverted.

Figs. 5 and 6 are fragmentary sections substantially similar to Fig. 4 showing the freezing of the liquid.

Fig. 7 is a fragmentary section illustrating the release of the container from a frozen ice cake.

Figs. 8, 9, 10 and 11 are fragmentary sections showing modifications of the receptacle, respectively.

The herein disclosed process will be described in connection with a single receptacle to form a single frozen cake or block, but a plurality of filled receptacles may be subjected to a freezing temperature for simultaneously freezing the liquid therein as one step of the process. The receptacle or receptacles may be placed in the freezing chamber of a refrigerating unit, but by preference they are mounted on a support or holder to facilitate handling thereof.

The receptacle 1 consists of a container 2 having a bottom and side walls and a flanged cover 3 adapted to fit the open end of the container 2. Obviously it is desirable that the walls of these parts be relatively thin and formed of a material (which may be metal or plastic) and which may have a high co-efficient of heat conductivity; also, by preference the side walls of the container 2 are inclined outwardly toward its open end as such construction facilitates the separation of the container and frozen cake. Where the frozen cakes or blocks are for domestic use, the receptacle may be formed of paper, its inner wall preferably being coated with suitable material such as paraffin. The receptacle may be of any desired size and/or shape in cross section.

The first step of my process consists in partially filling the container 2 to substantially a level 2' slightly below its open end and laying the cover 3 thereon, whereby is provided an air space 4 between the surface of the liquid and the cover 3 (see Fig. 2). The liquid in the receptacle should equal an amount ranging from 85% to 95% of the volumetric capacity thereof. The filling level for the liquid may be indicated on the side wall of the container by a mark or embossment, as shown at 2a, or such mark may consist of an opening, as later set forth, as the volume of air in this space has a definite relation to the volume of liquid in the container 2, as will later be apparent. Next the receptacle 1 is inverted. Where a single receptacle 1 is being inverted the cover 3 may be held in position during such operation by the hand of the user. However, after the cover is inverted the cover is held in place by atmospheric pressure. Where a plurality of receptacles 1 are used, as later set forth, a holder, indicated as an entirety at 5, having means 6 for holding the covers 3 in position during the inverting operation, is employed. The inverting of the receptacle serves to form between the body of the liquid therein and the bottom wall 2x of the container the space 4 filled with air under a reduced pressure and sealed by the liquid therein and the external atmospheric pressure of 760 mm. (14.7 pounds) per square inch, which latter pressure serves to seal the cover 3 on the open end of the container 2 (see Figs. 4, 8, 9 and 10), thereby establishing and maintaining said liquid level in the container in the proper ratio of the space occupied by the liquid to that of the reduced pressure area 4 in the container.

Next, the receptacle is placed in a chamber 7 (see Fig. 3) and subjected to a temperature sufficiently low to freeze the liquid in the receptacle 1. The refrigerating chamber 7 for illustrative purposes is shown as consisting of a unit forming part of a domestic mechanical refrigerator. The freezing of the liquid initially takes place on the inner walls of the container 2 and cover 3 (see Fig. 5) and gradually progresses until the entire body of the liquid is frozen into a solid cake or block A (see Fig. 6). As this progressive freezing takes place, the air contained in the liquid (which in the use of water amounts to approximately 3 parts of air to 100 parts of water) is forced out or expelled from the liquid into the space 4, so that all of the air therein is compressed to a point above atmospheric pressure, due to the expansion of the frozen liquid resulting from the freezing thereof, a greater portion of the contained air being forced from the liquid into the space 4 and compressed therein if the freezing operation is continued for an indefinite period.

Next the receptacle 1 is removed from the freezing chamber 7, whereby its walls are subjected to room temperature, the effect of which simultaneously causes a separation of the frozen body of liquid and the points of contact thereof with the sides of the container 2 and cover 3 and expands the compressed air in the space 4, such expansion of the air serving to bodily force the container 2 outwardly relative to the cover and frozen cake A, with a quick movement, as shown in Fig. 7. The air expansion and release of the container 2 is usually accompanied by a sound, such as a pop. Following the release of the container the ice cake is readily detached from the cover 3 or immediately becomes detached due to the room temperature.

In some instances, if the receptacle is placed on a support in inverted position, the expansive force of the compressed air is sufficient to impel the container 2 upwardly ten or twelve inches.

When a receptacle 1 is filled and inverted, as above set forth, it may be placed on the shelf 7a in the chamber 7 as shown in Fig. 8; likewise any number of receptacles 1 may be assembled on the shelf and the liquid therein frozen. When one or more receptacles are used in this manner, I prefer to provide the cover 3 with outwardly extending embossments 3x which insure a connection with the shelf 7a, to effect heat transfer by conduction, and permit circulation of the refrigerating medium below and in contact with the cover 3.

For domestic purposes it is desirable to simultaneously freeze a large number of ice cakes. For this purpose I provide the holder 5, which is constructed to individually support the receptacles 1, whereby one or more may be removed from the holder, each separated from the frozen liquid and then re-filled to the predetermined level and replaced in the holder and the latter in inverted position returned to the chamber 7. This construction and arrangement precludes the application of cold or hot water to the assembled receptacles or any portion thereof, to remove the frozen cake or cakes, as well as waste of those cakes or blocks in whole or in part, not required for immediate use. The form of holder 5, shown for illustrative purposes, consists of a wire frame 5a having intermediate connecting elements 5b and side and end elements 5b' forming between them annular seats 5c, each adapted to removably support a receptacle 1. These elements 5b, 5b', 5c, are arranged to provide outer rows of seats 5c and an intermediate row of seats 5c, but it will be understood that the arrangement or grouping of the seats will depend upon the size and/or shape of the receptacles 1 and/or the capacity of the holder 5 as well as the size of the chamber 7 into which the holder is to be placed. Also, in the form of holder construction shown, the wire frame 5a is provided with suitable legs 5' on which it is supported while the containers are being seated in the seats 5c and filled with the predetermined quantity of liquid to be frozen, although the containers may be filled before they are placed in the holder. The section of wire at one end of the frame 5a is embossed as shown at 5x, to form pivots on which hold-down members 8, which form the cover holding means 6, are swingably mounted, preferably one member 8 being provided for each row of receptacles 1. The opposite or outer end of each member 8 is bent downwardly and inwardly to provide a catch 8a arranged to engage the wire section at the adjacent side of the wire frame 5a. The hold-down members 8 are preferably formed of resilient wire which permits the catch 8a to releasably engage the wire frame. Each member 8 is corrugated from end to end to provide inwardly extending portions 8a' which engage the covers 3 to hold them in position while the holder is being operated to invert the receptacles 1. Accordingly, when the receptacles 1 are filled to the predetermined level (as already set forth) and the members 8 positioned, as shown in Figs. 1 and 2, the holder may be inverted and placed in the chamber 7 (see Fig. 3). In this form of construction, the receptacles 1 are supported in a manner which provides maximum surface exposure to the refrigerating medium, whereas the hold-down members provide direct conduction contact between the shelf of the chamber 7 and covers 3. Although the hold-down members 8 maintain the covers 3 in position when the holder is inverted, the external atmospheric pressure seals them to the open ends of the containers to establish and maintain the liquid level therein.

If desired the inner walls of the containers, when formed of metal, may be chromium plated to provide a smooth inner wall, whereby the release of the container 2 from the frozen cake A, upon expansion of the air in the space 4, is facilitated.

Fig. 9 illustrates a modified form of construction wherein the cover 3 is embossed inwardly to form an inclined annular wall 9 which forms a seat for the cover when positioned on the open end of the container 2.

In the preferred application of the invention water is frozen in the receptacles 1 for use in cooling drinking water, tea, coffee, soft drinks and the like or for other purposes, but liquids other than water may be frozen according to my process.

The liquid level indication 2a shown in Fig. 2 (omitted from Figs. 3 to 9, inclusive) is shown as a shallow annular embossment, but may consist of a single indentation, an etched mark on the wall of the container 2 or a small port or opening 2x' formed in the side wall thereof, as shown in Fig. 10. In this modified form, in carrying out my process, the container 2 may be completely filled with the liquid to be frozen, the closure 3 positioned on its open end and the container 2 and closure 3 are inverted. It will be observed that the filling of the container 2, placing of the closure 3 thereon, and the inverting thereof may be effected in a relatively short period of time, so that no substantial quantity of the liquid will escape through the port 2x'. However, to eliminate the escape or leakage of the liquid, the user can conveniently place one of his fingers over the port while the container is being filled and inverted. Following this inverting operation a portion of the liquid will drain through the opening 2x' into the space 3' provided within the flange of the closure 3 until the level of the liquid therein rises to a plane slightly above the port 2x', whereupon atmospheric pressure will seal the remaining liquid in the container 2 and establish the level of the liquid therein, as shown at 2', in relation to the reduced air pressure in the container above the liquid. In this form of construction, the opening 2x' is spaced from the open end of the container, so that when the level 2' is established in the container the volume of liquid therein will be approximately 85 percent to 95 percent of the volumetric capacity of the container. From the foregoing description it will be observed that the volume of liquid in the container 1 is automatically controlled to provide the air space 4 therein. It will be understood that when the receptacle is placed in the chamber 7, the liquid in the closure, as well as that in the container is frozen, but such condition does not affect the expansion force of the compressed air in the container when the latter is subjected to room temperature.

Fig. 11 is a sectional view of a receptacle 1' consisting of a container 2b formed of paper in any well known manner, and a closure 3x' which may also be formed of paper. When these parts are formed of paper their inner walls may be covered and impregnated with a suitable material, such as paraffin, as shown at b, to insure non-porosity of the container walls and/or for sanitary reasons. Where a paper container is used in carrying out my process it may be used once and then discarded.

Fig. 12 indicates a modified construction of receptacle, indicated at 9, consisting of a container 9a and a closure 9b, the side walls of the container adjacent its open end being expanded circumferentially to form an annular shoulder 9', the purpose of which is to indicate to the user the quantity of liquid which is to be frozen, to be filled in the container, whereby the required level is gaged and the air space 4 results. In this form of construction any and all obstructions on the wall of the container 9a are eliminated to permit free movement of the container when, following the freezing of the liquid therein, the compressed air effects a separation of the container from the cake and cover 9b.

The closure 3 is preferably formed with a peripheral flange, as shown in Figs. 1 to 8, inclusive, 10, 11 and 12, to facilitate its positioning on the container 2; also this flange may be provided with outwardly extending embossments 3'', which permit the closure to be readily gripped when removing an ice cake A therefrom.

To those skilled in the art to which my invention relates many changes in construction and widely different embodiments of the invention will be apparent without departing from the spirit and scope thereof. My disclosures and the description herein are purely illustrative and are not intended to be in any sense limiting.

What I claim is:

1. The herein disclosed process employing a receptacle consisting of a device for making an ice cake or block comprising a container and a closure therefor, which consists in filling the container with the liquid to be frozen to a level within a range fixed by the pressure which must be imposed on a body of air trapped in said container to overcome the bond between the container and an ice cake or block therein and positioning the closure on the open end of said container, then inverting the recepacle, whereby a sealed space filled with air is provided between the bottom of the container and the body of liquid and atmospheric pressure seals the closure in position, and finally freezing the liquid into solid form, thereby expelling air contained in the liquid into said space and compressing all of the air in said space to said bond breaking pressure.

2. The herein disclosed process employing a receptacle consisting of a device for making an ice cake or block comprising a container and a closure therefor, which consists in filling the container with a quantity of the liquid to be frozen to approximately 85 per cent to 95 per cent of the volumetric capacity of the container and positioning the closure on the open end thereof, then inverting the receptacle, whereby a sealed space filled with air is provided between the bottom of the container and the body of liquid and atmospheric pressure seals the closure in position, and finally freezing the liquid into solid form, thereby expelling air contained in the liquid into said space and compressing all of the air in said space to a pressure above atmospheric pressure.

3. The herein disclosed process employing a receptacle consisting of a device for making an ice cake or block comprising a container and a closure therefor, which consists in filling the container with the liquid to be frozen to a level within a range fixed by the pressure which must be imposed on a body of air trapped in said container to overcome the bond between the container and an ice cake or block therein, and positioning the closure on the open end of said container, then inverting the receptacle, whereby a sealed space filled with air is provided between the bottom of the container and the body of liquid and atmospheric pressure seals the closure in position, then freezing the liquid into solid form, thereby expelling air contained in the liquid into said space and compressing all of the air in said space to a pressure above atmospheric pressure, and finally subjecting the receptacle to a temperature above the freezing temperature of the liquid to expand the air in said space and separate the container from the ice cake or block and closure.

4. The herein disclosed process of forming a plurality of ice cakes or blocks employing a holder and a plurality of receptacles each comprising a container and a closure therefor, which consists in mounting the containers in the holder, then in filling the containers with the liquid to be frozen to a predetermined level below their open ends and positioning the closures on said open ends, then removably securing the closures in position, then inverting the holder, whereby an air space is provided between the bottom of each container and the body of liquid therein and atmospheric pressure seals the closure therefor in position, then in freezing the liquid in the receptacles into solid form, thereby expelling the air contained in the liquid in each receptacle into said air spaces and compressing the air to a pressure above atmospheric pressure, and finally removing one or more of the receptacles from the holder and expanding the air in said spaces to separate the containers from the formed ice cakes or blocks.

5. The herein disclosed process of forming a plurality of ice cakes or blocks employing a holder and a plurality or receptacles each comprising a container and a closure therefor, which consists in mounting the containers in the holder, then in filling each of the containers with a quantity of the liquid to be frozen equal to approximately 85 percent to 95 percent of its volumetric capacity and positioning the closures on the containers, then removably securing the closures in position, then inverting the holder, whereby an air space is provided between the bottom of each container and the body of the liquid therein and atmospheric pressure seals the closures in position, then in freezing the liquid in the receptacles into solid form, thereby expelling the air contained in the liquid in each receptacle into said air spaces and compressing the air to a pressure above atmospheric pressure, and finally removing one or more of the receptacles from the holder and expanding the air in said spaces to separate the containers from the formed ice cakes or blocks.

6. The herein disclosed process employing a receptacle consisting of a device for making an ice cake or block comprising a container formed with an opening in its side wall determined by a level within a range fixed by the pressure which must be imposed on a body of air trapped in said container to overcome the bond between the container and an ice cake or block therein and a cup-like closure for the container, which consists in filling the container to or above said opening with the liquid to be frozen and positioning the closure on the open end thereof, then inverting the receptacle and permitting any excess liquid to flow through said opening into the closure to fill the latter to the level of the opening, whereby an air space is provided between the bottom of the container and the body of liquid and atmospheric pressure seals the closure in position, and finally freezing the liquid into solid form, thereby expelling air contained in the liquid into said space and compressing all of the air in said space to said bond breaking pressure.

7. A process employing a device for making an ice cake or block comprising a receptacle consisting of a container formed with an opening in its side wall determined by a level within a range fixed by the pressure which must be imposed on a body of air trapped in said container to overcome the bond between the container and an ice cake or block therein, and a cup-like closure for the container, which consists in filling the container to or above said opening with the liquid to be frozen and positioning the closure on the open end of said container, then inverting said receptacle and permitting any excess liquid to flow through said opening into said closure to fill the latter to the level of said opening, whereby an air space is provided between the bottom of the container and the body of liquid therein and atmospheric pressure seals the closure in position, then in freezing the liquid in said container into solid form, thereby expelling air contained in the liquid into said space and compressing all of the air therein to said bond breaking pressure, and finally subjecting the walls of said receptacle to a temperature above the freezing temperature of the liquid to effect expansion of the compressed air in said space.

8. A device of the class described comprising a receptacle for holding a body of liquid while being frozen into a cake or block, said receptacle consisting of a container formed of heat conducting material and having bottom and side walls and open at one end and adapted to be initially filled with the liquid to be frozen and a cup shaped closure on which said container is removably supported in inverted position during freezing of the liquid, the side wall of the closure forming with the side wall of said container a channel around the latter, and the side wall of said container, inwardly of the plane of the free circumferential edge of the closure side wall, being formed with an opening determined by a level within a range fixed by the pressure which must be imposed on a body of air trapped in said container to overcome the bond between the container and an ice cake or block therein and arrange, when said receptacle is inverted, to permit flow of the liquid from said container into said channel to a level above said opening, whereby said container is sealed to said closure by atmospheric pressure and the body of liquid remaining in the container is arranged to cooperate with the bottom and adjacent side walls thereof to form a sealed space filled with air which is adapted to be compressed by the air expelled from the liquid due to freezing of the liquid to said bond breaking pressure.

9. The herein disclosed process of producing a frozen body of liquid, consisting of the steps of charging a container with a volume of liquid to be frozen to a level within a range fixed by the pressure which must be imposed on a body of air trapped in said container to overcome the bond between the container and a body of ice therein, closing the container, inverting the container to provide a hermetically sealed space filled with air above the level of the liquid in the inverted container, subjecting the liquid to a heat extraction medium, thereby freezing the liquid and expelling from the liquid air entrained therein into said air space to increase the pressure of all the air therein above atmospheric pressure, then removing the container from the influence of the heat extraction medium, and finally subjecting the container to a temperature above the freezing point of the liquid to increase the pressure of all of the air in said air space and simultaneously decreasing the adhesion of the frozen body with the wall of the container, whereby the expansion of the air in said space forcibly separates the frozen body from the walls of the container.

10. A receptacle adapted to contain liquid and be subjected to a refrigerating medium for freezing the liquid, comprising a container formed of heat conducting material and having a bottom and side walls forming an open end to permit filling of the container with a quantity of the liquid and a cover loosely fitting the open end of said container and adapted to be sealingly and releasably related thereto by atmospheric pressure when the receptacle, with a quantity of liquid therein, is inverted, the side wall of the container being provided with a gage to indicate the quantity of liquid to be filled therein.

11. A portable device for freezing liquid to provide a plurality of ice cakes or blocks, comprising a holder having a plurality of liquid holding chambers or containers, closure members for said chambers or containers loosely engaging the open ends thereof, and means for removably holding said members in closing relation to said chambers or containers, whereby said holder may be inverted and placed in a refrigerated chamber.

12. A device for freezing liquid into a plurality of ice cakes or blocks comprising a plurality of containers adapted to hold a predetermined quantity of liquid to be frozen, a skeleton frame provided with a plurality of seats each adapted to removably support one of said containers, a closure loosely fitting the open end of each container, and means carried by said frame for releasably holding the closures in position.

13. A receptacle adapted to contain liquid and be subjected to a refrigerating medium for freezing the liquid, comprising a container formed of heat conducting material and having a bottom and side walls forming an open end to permit filling of the container with a quantity of the liquid and a cover loosely fitting the open end of said container and adapted to be sealingly and releasably related thereto by atmospheric pressure when the receptacle, with a quantity of liquid therein, is inverted, the side wall of the container adjacent its open end being expanded or off-set outwardly to form a shoulder adapted to serve as a liquid level indicator.

RUSSELL PAUL DUNMIRE.

REFERENCES CITED

The following references are of record in the file of this patent:

UNITED STATES PATENTS

| Number | Name | Date |
| --- | --- | --- |
| 596,732 | Atstatt | Jan. 4, 1898 |
| 1,040,707 | Liney | Oct. 8, 1912 |
| 1,226,594 | Pruefert | May 15, 1917 |
| 1,824,308 | Storer | Sept. 22, 1931 |
| 1,824,309 | Storer | Sept. 22, 1931 |
| 1,964,476 | Newman | June 26, 1934 |
| 2,100,288 | Horlacker | Nov. 23, 1937 |
| 2,166,560 | Schmelzer | July 18, 1939 |
| 2,247,018 | Henning | June 24, 1941 |
| 2,350,950 | Wiley | June 6, 1944 |
| 2,351,318 | Carew | June 13, 1944 |